(12) United States Patent
Lee et al.

(10) Patent No.: US 11,631,400 B2
(45) Date of Patent: Apr. 18, 2023

(54) ELECTRONIC APPARATUS AND CONTROLLING METHOD THEREOF

(71) Applicant: SAMSUNG ELECTRONICS CO., LTD., Suwon-si (KR)

(72) Inventors: Beomseok Lee, Suwon-si (KR); Sangha Kim, Suwon-si (KR); Yoonjin Yoon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 179 days.

(21) Appl. No.: 16/786,654

(22) Filed: Feb. 10, 2020

(65) Prior Publication Data
US 2020/0258504 A1  Aug. 13, 2020

(30) Foreign Application Priority Data

Feb. 11, 2019  (KR) ........................ 10-2019-0015516

(51) Int. Cl.
| | | |
|---|---|---|
| *G10L 15/16* | (2006.01) | |
| *G10L 15/22* | (2006.01) | |
| *G10L 15/06* | (2013.01) | |
| *G10L 15/18* | (2013.01) | |

(52) U.S. Cl.
CPC ............ *G10L 15/16* (2013.01); *G10L 15/063* (2013.01); *G10L 15/18* (2013.01); *G10L 15/22* (2013.01); *G10L 2015/223* (2013.01)

(58) Field of Classification Search
CPC ..... G10L 15/26; G10L 15/063; G10L 15/065; G10L 15/07
See application file for complete search history.

(56) References Cited

U.S. PATENT DOCUMENTS

| | | | |
|---|---|---|---|
| 7,542,971 B2 | 6/2009 | Thione et al. | |
| 9,324,323 B1* | 4/2016 | Bikel | G10L 15/197 |
| 10,079,022 B2 | 9/2018 | Kim | |
| 10,354,643 B2 | 7/2019 | Chakladar et al. | |
| 10,388,272 B1* | 8/2019 | Thomson | G10L 15/063 |
| 10,818,285 B2 | 10/2020 | Lee et al. | |
| 10,832,664 B2* | 11/2020 | Biadsy | G10L 15/02 |
| 2003/0055642 A1 | 3/2003 | Harada | |
| 2003/0236664 A1* | 12/2003 | Sharma | G10L 15/08 704/251 |
| 2005/0171926 A1 | 8/2005 | Thione et al. | |
| 2009/0204620 A1 | 8/2009 | Thione et al. | |

(Continued)

FOREIGN PATENT DOCUMENTS

| | | |
|---|---|---|
| JP | 2004-509385 A | 3/2004 |
| JP | 4089861 B2 | 5/2008 |

(Continued)

OTHER PUBLICATIONS

International Search Report dated May 13, 2020 issued by the International Searching Authority in counterpart International Application No. PCT/KR2020/001780 (PCT/ISA/210).

(Continued)

*Primary Examiner* — Douglas Godbold
(74) *Attorney, Agent, or Firm* — Sughrue Mion, PLLC

(57) ABSTRACT

An electronic apparatus configured to acquire information on a plurality of candidate texts corresponding to input speech of a user through a general speech recognition module, determine text corresponding to the input speech from among the plurality of candidate texts using a trained personal language model, and output the text as a result of speech recognition of the input speech.

14 Claims, 11 Drawing Sheets

(56) References Cited

U.S. PATENT DOCUMENTS

| | | | |
|---|---|---|---|
| 2011/0054894 A1* | 3/2011 | Phillips | G10L 15/30 704/235 |
| 2012/0316877 A1* | 12/2012 | Zweig | G10L 15/197 704/E15.001 |
| 2016/0111084 A1 | 4/2016 | Bang et al. | |
| 2016/0232893 A1 | 8/2016 | Subhojit | |
| 2017/0084268 A1 | 3/2017 | Yoo et al. | |
| 2017/0110117 A1 | 4/2017 | Chakladar et al. | |
| 2017/0154033 A1* | 6/2017 | Lee | G10L 15/16 |
| 2017/0194002 A1 | 7/2017 | Kim | |
| 2018/0182386 A1 | 6/2018 | Lee et al. | |
| 2020/0074993 A1 | 3/2020 | Lee et al. | |

FOREIGN PATENT DOCUMENTS

| | | |
|---|---|---|
| JP | 4678193 B2 | 4/2011 |
| KR | 10-2014-0005639 A | 1/2014 |
| KR | 10-2016-0030168 A | 3/2016 |
| KR | 10-1610151 B1 | 4/2016 |
| KR | 10-2016-0098771 A | 8/2016 |
| KR | 10-2017-0034227 A | 3/2017 |
| KR | 10-2017-0044426 A | 4/2017 |
| KR | 10-2017-0081883 A | 7/2017 |
| KR | 10-2018-0024167 A | 3/2018 |
| KR | 10-2018-0071931 A | 6/2018 |
| KR | 10-2018-0074210 A | 7/2018 |

OTHER PUBLICATIONS

International Written Opinion dated May 13, 2020 issued by the International Searching Authority in counterpart International Application No. PCT/KR2020/001780 (PCT/ISA/237).

Communication dated Apr. 27, 2021 by the Korean Intellectual Property Office in counterpart Korean Patent Application No. 10-2019-0015516.

* cited by examiner

ELECTRONIC APPARATUS AND CONTROLLING METHOD THEREOF

CROSS-REFERENCE TO RELATED APPLICATIONS

This application claims priority from Korean Patent Application No. 10-2019-0015516, filed on Feb. 11, 2019, in the Korean Intellectual Property Office, the disclosure of which is herein incorporated by reference in its entirety.

BACKGROUND

1. Field

The disclosure relates to an electronic apparatus and a controlling method thereof. More particularly, the disclosure relates to an electronic apparatus capable of performing speech recognition by using an acoustic model and a language model, and a controlling method thereof.

2. Description of the Related Art

In recent years, artificial intelligence systems have been used in various fields. The artificial intelligence systems, unlike existing rule-based smart systems, are machines that learn and judge themselves. As the artificial intelligence system is increasingly used, a recognition rate is improved and a determination result can be provided more accurately, so that the existing rule-based smart system is gradually being replaced by a deep learning-based artificial intelligence system.

Artificial intelligence (AI) technologies consist of machine learning (e.g., deep learning) and elementary technologies that utilize machine learning.

Machine learning is an algorithm technology that classifies or learns characteristics of input data. Elementary technology is a technology that simulates functions of human brain cognition, judgment, etc. by using machine learning algorithms such as deep learning, or the like, and consists of technical areas such as linguistic comprehension, visual comprehension, reasoning or prediction, knowledge representation, motion control, and the like. In particular, the linguistic comprehension is a technology for recognizing and applying or processing human language or characters, including natural language processing, machine translation, interactive system, question and answer, speech recognition or synthesis, and the like.

Meanwhile, although an accuracy rate of speech recognition using an electronic device (e.g., a smartphone) is increasing in recent years, present speech recognition systems do not provide a perfect speech recognition result. In particular, although a language or pronunciation that is frequently used is different from each other, there is a limit in that speech recognition provided in recent years cannot be provided in consideration of specificity of the user.

Therefore, a search for methods for providing more accurate speech recognition in accordance with characteristics of the user is required.

SUMMARY

According to an aspect of an embodiment, there is provided an electronic apparatus including a memory storing at least one instruction and a personal language model trained to recognize speech of a user of the electronic apparatus, and a processor configured to execute at least one instruction, wherein the processor is configured to, based on input speech of the user of the electronic apparatus, acquire information on a plurality of candidate texts corresponding to the input speech through a general speech recognition module text corresponding to the input speech from among the plurality of candidate texts using the personal language model, and output the text as a result of speech recognition of the input speech.

According to an aspect of an embodiment, there is provided a method of controlling an electronic apparatus including based on input speech of a user of the electronic apparatus, acquiring information on a plurality of candidate texts corresponding to the input speech through a general speech recognition module, selecting text corresponding to the input speech from among the plurality of candidate texts using a personal language model trained to recognize speech of the user, and outputting the text as a result of speech recognition of the input speech.

According to an aspect of an embodiment, there is provided an electronic apparatus including a memory storing at least one instruction, a personal language model trained to recognize speech of a user of the electronic apparatus, and a personal acoustic model trained to recognize the speech of the user, and a processor configured to execute the at least one instruction, wherein the processor when executing the at least one instruction is configured to: based on input speech of the user, identify text corresponding to the input speech through the personal acoustic model and the personal language model, output the text as a result of speech recognition of the input speech, and retrain the personal acoustic model based on the text and the input speech.

According to an aspect of an embodiment, there is provided a method of controlling an electronic apparatus including based on input speech of a user of the electronic apparatus, identifying text corresponding to the input speech through a personal acoustic model trained to recognize speech of a user of the electronic apparatus and a personal language model trained to recognize the speech of the user, outputting the text as a result of speech recognition of the input speech, and retraining the personal acoustic model based on the text and the input speech.

BRIEF DESCRIPTION OF THE DRAWINGS

The above and or other aspects of the disclosure will be more apparent by describing certain exemplary embodiments with reference to the accompanying drawings, in which.

DETAILED DESCRIPTION OF EXEMPLARY EMBODIMENTS

Figure 1:
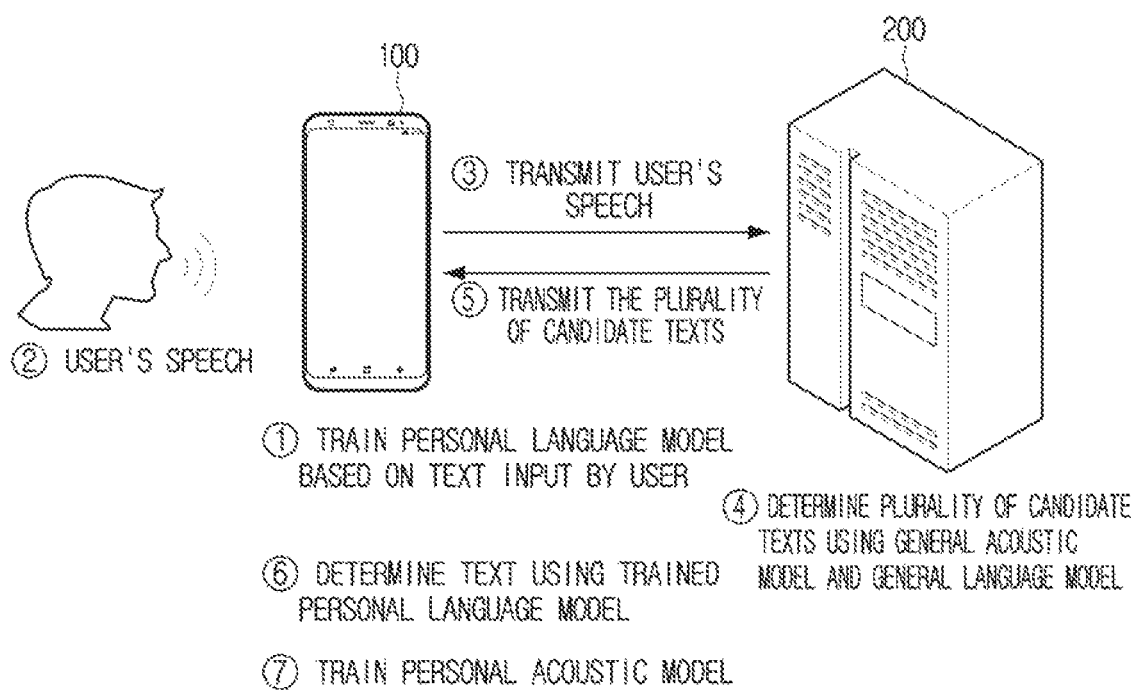
FIG. 1 is a use diagram illustrating a speech recognition system for recognizing a user's speech using a personal language model learned based on text input by a user according to an embodiment of the disclosure.

An object of the disclosure is to provide an electronic apparatus capable of learning a personal language model based on text input by a user and identifying or determining a text corresponding to a user's speech using the learned personal language model, and a controlling method thereof.

Another object of the disclosure is to provide an electronic apparatus capable of identifying or determining a text corresponding to a user's speech using a learned personal language model and learning a personal acoustic model based on the text and the user's speech, and a controlling method thereof.

It should be understood that the disclosure is not limited to the specific embodiments described hereinafter, but includes various modifications, equivalents, and/or alternatives of the embodiments of the disclosure. In relation to explanation of the drawings, similar drawing reference numerals may be used for similar constituent elements.

The terms "have," "may have," "include," and "may include" used in the exemplary embodiments of the present disclosure indicate the presence of corresponding features (for example, elements such as numerical values, functions, operations, or parts), and do not preclude the presence of additional features.

In the description, the term "A or B," "at least one of A or/and B," or "one or more of A or/and B" may include all possible combinations of the items that are enumerated together. For example, the term "A or B" or "at least one of A or/and B" may designate (1) at least one A, (2) at least one B, or (3) both at least one A and at least one B.

The expression "1," "2," "first," or "second" as used herein may modify a variety of elements, irrespective of order and/or importance thereof, and only to distinguish one element from another. Accordingly, without limiting the corresponding elements.

If it is described that a certain element (e.g., first element) is "operatively or communicatively coupled with/to" or is "connected to" another element (e.g., second element), it should be understood that the certain element may be connected to the other element directly or through still another element (e.g., third element). On the other hand, if it is described that a certain element (e.g., first element) is "directly coupled with/to" or is "directly connected to" another element (e.g., second element), it may be understood that there is no other element (e.g., third element) between the certain element and the another element.

In the description, the term "configured to" may be understood as, for example, "suitable for," "having the capacity to," "designed to," "adapted to," "made to," or "capable of" under certain circumstances. The term "configured to (set to)" does not necessarily mean "specifically designed to" in a hardware level. Under certain circumstances, the term "device configured to" may refer to "device capable of" doing something together with another device or components. For example, a phase of "subprocessor configured (or set up) to perform A, B, and C" may mean a dedicated processor (e.g., embedded processor), or a generic-purpose processor (e.g., CPU or application processor) capable of performing corresponding operations by executing one or more software programs stored on a memory device.

An electronic apparatus according to various exemplary embodiments may include at least one of, for example, smartphone, tablet PC, mobile phone, video phone, e-book reader, desktop PC, laptop PC, netbook computer, workstation, server, PDA, portable multimedia player (PMP), MP3 player, medical device, camera, or a wearable device. Wearable devices may be accessory (e.g. watches, rings, bracelets, anklets, necklaces, eyeglasses, contact lenses, or a head-mounted-device (HMD), textile or apparel integral (e.g. electronic clothing), and may include at least one of a body-attachable device (e.g., skin pad or tattoo), or bio implantable circuit. In certain embodiments, an electronic apparatus may include at least one of, for example, television, digital video disk (DVD) player, audio, refrigerator, air conditioner, cleaner, oven, microwave, washing machine, air purifier, set top box, home automation control panel, security control panel, media box (e.g. Samsung HomeSync™, Apple TV™, or Google TV™), game console (e.g. Xbox™, PlayStation™), electronic dictionary, electronic key, camcorder, or electronic picture frame.

In another embodiment, an electronic apparatus may include at least one of, for example, a variety of medical devices (e.g., various portable medical measuring devices (such as blood glucose meters, heart rate monitors, blood pressure monitors, or body temperature meters), magnetic resonance angiography (MRA), magnetic resonance imaging (MRI), computed tomography (CT), cameras or ultrasounds, or the like), navigation devices, global navigation satellite systems (GNSS), event data recorders (EDR), flight data recorder (FDR), automotive infotainment devices, ship electronic equipment (e.g. ship navigation systems, gyro compasses, etc.), avionics, security devices, vehicle head units, industrial or household robots, drones, ATMs at financial institutions, point of sale (POS) of stores, or Internet of things devices (e.g., light bulbs, various sensors, sprinkler devices, fire alarms, thermostats, street lights, toasters, exercise equipment, hot water tanks, heaters, boilers, etc.).

In this disclosure, the term "a user" may indicate a person using or controlling an electronic apparatus or an apparatus (e.g., artificial intelligent electronic apparatus) that uses or controls an electronic apparatus.

Hereinafter, one or more exemplary embodiments will be described in detail with reference to the accompanying drawings. FIG. 1 is a use diagram illustrating a speech recognition system for recognizing a user's speech using a personal language model learned based on text input by a user according to an embodiment of the disclosure.

The electronic apparatus 100 may recognize a user's speech and may include an artificial intelligence agent that provides various services based on the recognized user's speech. For example, the artificial intelligence agent may provide a control service capable of controlling the electronic apparatus 100 or an external apparatus connected to the electronic apparatus 100 based on the recognized user's speech, an interactive service that provides response with respect to the recognized user's speech, and a search service based on the recognized user's speech, and may perform a chatting service with other users based on the recognized user's speech.

In particular, the electronic apparatus 100 may perform speech recognition in association with an external server 200. In this case, although the external server 200 is illustrated as one in FIG. 1, this is only an embodiment and the external server may be implemented as a plurality of servers. For example, the electronic apparatus 100 may use a general speech recognition module including a personal acoustic model and a personal language model stored in the electronic apparatus 100, and a general acoustic model and a general language model stored in the external server 200, and recognize the user's speech by referencing the acoustic model and the language model of the electronic apparatus 100 and the external sever 200. The electronic apparatus 100 and the external server 200 may further include a vocabulary or pronunciation dictionary for recognizing the user's speech. The general speech recognition module stored in the external server 200 may include the general acoustic model and the general language model implemented separately, but this is only an embodiment, and two models may be implemented as one artificial intelligence model.

The acoustic model refers to a model that stores acoustic characteristics of a phonological environment of a corresponding language and stores a representative pattern as a probabilistic model. In this case, the acoustic model is based on a Hidden Markov Model (HMM), which is a probabilistic statistical method, but this is only an embodiment. There may be various types of the acoustic model, such as the Hidden Markov Model or Deep Neural Network (HMM or DNN) methods. The personal acoustic model may refer to an acoustic model that is stored in the electronic apparats 100 to store a sound pattern in consideration of personal characteristics of the user who uses the electronic apparatus 100, and the general acoustic model may be stored in the external server 200 to store the general sound pattern.

The language model refers to a model constructed by collecting connectivity between words from a text corpus in a statistical manner so that a sentence uttered by the user is correctly recognized. In this case, the language model may be one of an N-Gram language model, a neural language model, and a rule based language model based on user feedback. In particular, the personal language model is stored in the electronic apparatus 100 and stores statistical information about relationships between languages that are frequently used by the user, and the general language model is stored in the external server 200 and stores statistical information about relationships between languages that are generally used. In this case, the personal language model may be provided according to users. In other words, when the electronic apparatus 100 is implemented as an AI speaker or the like and there are a plurality of users who use the electronic apparatus 100, the personal language model may have a plurality of personal language models corresponding to the plurality of users. In addition, a plurality of personal language models may exist for one user. For example, a plurality of personal language models may exist for one user according to a language type, an application type, or the like.

Meanwhile, the electronic apparatus 100 may learn the personal language model based on text input by the user. For example, the electronic apparatus 100 may acquire information, such as text input by a user for chatting with another user, text input by a user for searching for information, text input by a user for composing mail, a message, SMS, and text recognized through handwriting input by user's touch, and text input through copy and paste, while using the electronic apparatus 100. In addition, the electronic apparatus 100 may train the personal language model based on information about text input by the user. In other words, the electronic apparatus 100 may train the personal language model to increase a statistical probability for text that is frequently used by the user. In this case, the electronic apparatus 100 may train the personal language model based on the number of times the user uses the corresponding text.

In addition, the electronic apparatus 100 may train the personal language model based on user information and the text input by the user. For example, the electronic apparatus 100 may acquire user information, such as user profile information, user preference information, user location information, or the like, identify text on the acquired user information, and train the personal language model based on the identified text. In other words, the electronic apparatus 100 may train the personal language model to increase the statistical probability for the text acquired based on the user information. For example, the electronic apparatus 100 identifies that "child" exists in the user profile information, the electronic apparatus 100 may train the personal language model to increase the statistical probability for the text related to parenting. As another example, the electronic apparatus 100 identifies that "soccer" exists in the user preference information, the electronic apparatus 100 may train the personal language model to increase the statistical probability for the text related to soccer. As another example, when "Woomyeon-dong" is detected above a threshold value in the user location information, the electronic apparatus 100 may train the personal language model to increase the statistical probability of the text "Woomyeon-dong."

After the personal language model is trained based on the text input by the user or the user information, the electronic apparatus 100 may acquire user's speech uttered by the user. In this case, the electronic apparatus 100 may obtain the user's speech through a microphone present in the electronic apparatus 100, for example. The user's speech may be acquired through an external microphone electrically connected to the electronic apparatus 100.

The electronic apparatus 100 may transmit the user's speech to the external server 200.

The external server 200 may identify a plurality of candidate texts corresponding to the user's speech using the general speech recognition module including the general acoustic model and the general language model. In this case, the external server 200 may acquire information on scores of the plurality of candidate texts corresponding to the user's speech through the general acoustic model and the general language model. In this case, the score may be a score indicating information on a probability that the candidate text is a final text corresponding to the user's speech.

The external server 200 may identify information on the plurality of candidate texts by the electronic apparatus 100. For example, the external server 200 may transmit the identified plurality of candidate texts and score information about each of the plurality of candidate texts to the electronic apparatus 100.

The electronic apparatus 100 may identify the text corresponding to the user's speech among the plurality of candidate texts by using the trained personal language model. The electronic apparatus 100 may correct scores of the plurality of candidate texts by using the trained personal language model. For example, the electronic apparatus 100 may correct scores for the plurality of candidate texts to increase scores for the candidate texts including the text frequently used by the user among the plurality of candidate texts.

The electronic apparatus 100 may identify the candidate text having the highest corrected score among the plurality of candidate texts as text corresponding to the user's speech. In this case, the electronic apparatus 100 may identify whether the candidate text having the highest corrected score is greater than or equal to a threshold score. If the candidate text having the highest corrected score is greater than or equal to the threshold score, the electronic apparatus 100 may identify the candidate text having the highest corrected score as the text corresponding to the user's speech.

The electronic apparatus 100 may output text identified as a result of recognizing the user's speech. In this case, the electronic apparatus 100 may output the identified text through a display. Alternatively, the electronic apparatus 100 may output the text identified as a result of recognizing the user's speech to a module for natural language understanding in order to perform a conversational service. In this case, when the module for the natural language understanding exists in the external server, the electronic apparatus 100 may transmit the identified text to the external server.

However, if the candidate text having the highest corrected score is less than the threshold score, the electronic apparatus 100 may inquire to a user of the electronic apparatus 100 whether the candidate text having the highest corrected score is the text corresponding to the user's speech or output a message that requires the user to again input the user's speech. In addition, when the candidate text having the highest score and the candidate text having the highest corrected score among the plurality of candidate texts received or obtained from the external server 200 are different, the electronic apparatus 100 may output a message inquiring whether the candidate text having the highest corrected score is text corresponding to the user's speech.

In this case, when user feedback on the text identified through the output message is input, the electronic apparatus 100 may retrain the personal language model based on the corrective user feedback. For example, when negative feedback is input to the identified text, the electronic apparatus 100 may retrain the personal language model to lower a statistical probability of the identified text based on the negative user feedback.

In addition, the electronic apparatus 100 may train the personal acoustic model based on the text identified as a voice recognition result of the user's speech and the user's speech. In other words, the electronic apparatus 100 may retrain the personal acoustic model to reflect user's characteristics based on text frequently used by the user and user's speech corresponding thereto.

Meanwhile, in the above-described embodiment, the electronic apparatus 100 is described that the electronic apparatus 100 interworks with the external server 200 to recognize the user's speech. However, this is only an embodiment, and the electronic apparatus 100 may use the personal acoustic model and the personal language model to recognize the user's speech. In particular, when the communication function is off such that a communication connection with the external server 200 is not possible, or the personal acoustic model and the personal language model have been trained for a threshold period, the electronic apparatus 100 may recognize the user's speech by using the personal acoustic model and the personal language model.

Meanwhile, the electronic apparatus 100 may use an artificial intelligence agent to recognize the user's speech as described above. At this time, the artificial intelligence agent may include a dedicated program for providing an Artificial Intelligence (AI) based service (e.g., voice recognition service, secretary service, translation service, search service, etc.), and may be executed by an existing general purpose processor (e.g., CPU) or a separate AI dedicated processor (e.g., GPU, etc.) of the electronic apparatus 100. In particular, the artificial intelligence agent may control various modules (e.g., interactive system), which will be described later.

When a preset user's speech (e.g., "Bixby," etc.) is input or a button provided on the electronic apparatus 100 (e.g., a button for executing an artificial intelligence agent) is pressed, the artificial intelligence agent may be triggered to be activated. In addition, the artificial intelligence agent may perform voice recognition on the input user's speech. Meanwhile, the artificial intelligence agent may control various devices or modules, which will be described later in detail.

Figure 2:
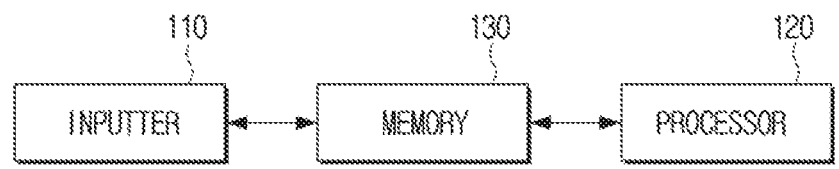
FIG. 2 is a block diagram illustrating a configuration of an electronic apparatus according to an embodiment of the disclosure.

FIG. 2 is a block diagram illustrating the configuration of the electronic apparatus according to an embodiment of the disclosure. As illustrated in FIG. 2, the electronic apparatus 100 may include an inputter 110, a memory 120, and a processor 130. However, the configuration of the electronic apparatus 100 is not limited to the above-described configuration, and some components may be added or omitted depending on a type of electronic apparatus 100.

The inputter 110 may include a circuit and may receive or obtain a user input for controlling the electronic apparatus 100. Particularly, the inputter 110 may receive or obtain a user input for inputting text to perform various services. For example, the inputter 110 may receive or obtain a user touch input through a touch panel for inputting text. However, the inputter 110 may obtain text through various input devices such as a keyboard, a mouse, or the like. Accordingly, the inputter 110 may be one or more user interfaces to the electronic apparatus 100.

The memory 120 may store data relating to at least one of the other elements of the electronic apparatus 100. The memory 120 may be implemented as a non-volatile memory, a volatile memory, a flash-memory, a hard disk drive (HDD), a solid state drive (SSD), or the like. The memory 120 may be accessed by the processor 130 and perform readout or recording or correction or deletion or update of the data stored therein, and the like. According to an embodiment of the disclosure, the memory may include the memory 120, read-only memory (ROM), a random access memory (RAM) within the processor 130, and a memory card attached to the electronic apparatus 100 (e.g., micro secure digital (SD), memory stick). Further, the memory 120 may store programs and data to be executed or utilized under control of the processor 120 to provide various screens to be displayed on a display area of the display, thereby effecting a user interface to be displayed on the electronic apparatus 100.

Figure 4:
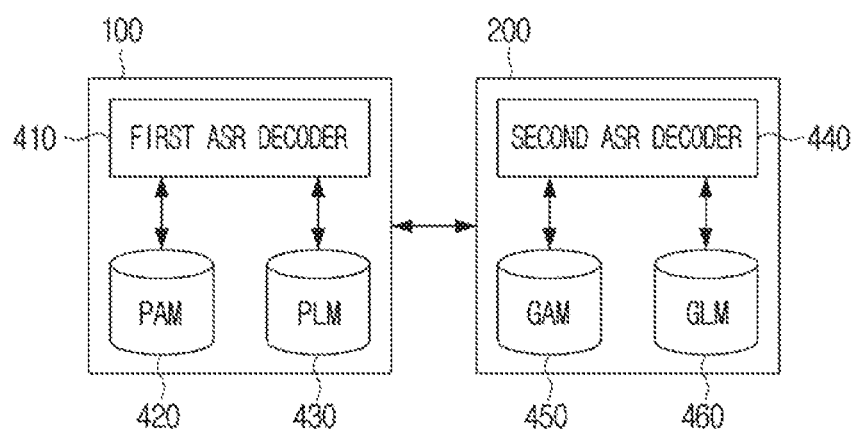
FIG. 4 is a diagram illustrating a configuration included in a speech recognition system for recognizing a user's speech according to an embodiment of the disclosure.

In addition, the memory 120 may store the artificial intelligence agent for recognizing the user's speech. In this case, the electronic apparatus 100 may use the artificial intelligence agent to generate natural language reply in response to receiving the user's speech. In addition, the memory 120 may include a plurality of components (or modules) for recognizing the user's speech as illustrated in FIG. 4. The relevant additional units will be explained below by referring to FIG. 4.

The processor 130 may be electrically connected to the memory 120 and the inputter, and control an overall operation and functions of the electronic apparatus 100. In particular, the processor 130 may train the personal language model based on the text input through the inputter 110 by executing at least one command stored in the memory 120. When the user's speech is input, the processor 130 may acquire information about the plurality of candidate texts corresponding to the user's speech through the general speech recognition module, and identify text corresponding to the user's speech among the plurality of candidate texts by using the trained personal language model. As a result, the processor 130 may control the electronic apparatus 100 to output text identified as a speech recognition result of the user's speech.

To be specific, the processor 130 may train the personal language model based on text input through the inputter 110. In this case, the processor 130 may train the personal language model based on text input through the inputter 110 while performing various services such as a chat service, a control service, a search service, or the like.

The processor 130 may train the personal language model based on a frequency of the text, the user feedback on the input text, whether the text is a professional term, whether the text is a proper noun, or the like. For example, as the frequency of the text input is high, the user feedback with respect to the text is positive, texts are specialized terms, and texts are proper nouns, the processor 130 may train the personal language model so that high scores are calculated. In addition, the processor 130 may train the personal language model based on length and size of the text. The processor 130 may not learn text stored in the general language model in the personal language model.

According to an embodiment, the processor 130 may train the personal language model by using text acquired based on user information in addition to the above-described text input by the user. In other words, the processor 130 may acquire text corresponding to user information, and may train the personal language model based on the acquired text. The user information may include at least one of user profile information, user preference information, and user location information, but the user information is not limited thereto. In addition, the processor 130 may receive or obtain the user's speech through a microphone.

When the user's speech is input, the processor 130 may obtain information about the plurality of candidate texts corresponding to the user's speech through the general acoustic model and the general language model. Specifically, the processor 130 may transmit the user's speech to the external server 200 that stores the general speech recognition module including the general acoustic model and the general language model. The processor 130 may thereby receive or obtain the plurality of candidate texts corresponding to the user's speech acquired through the general acoustic model and the general language model, and scores corresponding to the plurality of candidate texts from the external server 200.

The processor 130 may correct the scores corresponding to the plurality of candidate texts using the trained personal language model, and select the candidate text having the highest score among the corrected scores corresponding to the plurality of candidate texts as text corresponding to the user's speech. In this case, the processor 130 may identify whether the candidate text having the highest score is greater than or equal to the threshold score. If the candidate text having the highest score is greater than or equal to the threshold score, the processor 130 may select the candidate text having the highest score as the text corresponding to the user's speech. However, if the candidate text having the highest score is less than the threshold score, the processor 130 may provide a message that requests the user to again provide the user's speech.

The processor 130 may output the text identified as a result of recognizing the user's speech. In this case, when user feedback on the output text is input, the processor 130 may retrain the personal language model based on the user feedback. In addition, the processor 130 may train the personal acoustic model stored in the electronic apparatus 200 based on the identified text and the user's speech.

Figure 3:
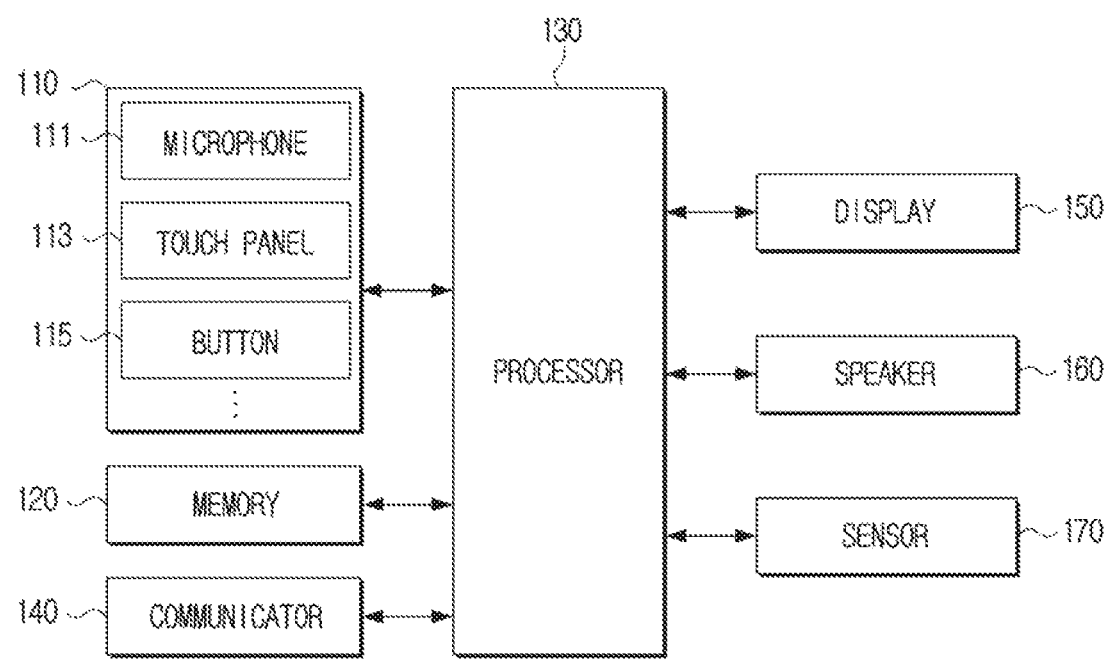
FIG. 3 is a block diagram illustrating a configuration of an electronic apparatus according to an embodiment of the disclosure.

FIG. 3 is a block diagram illustrating the configuration of the electronic apparatus in detail according to an embodiment of the disclosure. As illustrated in FIG. 3, the electronic apparatus 100 may include an inputter 110, a memory 120, a communicator 140, a display 150, a speaker 160, a sensor 170, and a processor 130. Meanwhile, because the inputter 110, the memory 120, and the processor 130 illustrated in FIG. 3 have been described with reference to FIG. 2, redundant descriptions thereof will be omitted.

The inputter 110 may receive or obtain a user input for controlling the electronic apparatus 100. In particular, the inputter 110 may receive or obtain a user input for inputting text. As illustrated in FIG. 3, the inputter 110 may include a microphone 111 for receiving a user's speech, a touch panel 113 for receiving a user touch using a user's hand or a stylus pen, and the like, and a button 115 for receiving a user operation. However, an example of the inputter 110 illustrated in FIG. 3 is merely an embodiment, and additional input devices (e.g., keyboard, mouse, motion inputter, etc.) may be included.

The communicator 140 may include a circuit and communicate wired or wirelessly with an external apparatus. The communicator 140 may be communicatively connected to the external apparatus through a third device (e.g., a repeater, a hub, an access point, a server, a gateway, or the like). Wireless communication, for example, may include a cellular communication using at least one among long-term evolution (LTE), LTE Advance (LTE-A), code division multiple access (CDMA), wideband CDMA (WCDMA), universal mobile telecommunications system (UMTS), wireless broadband (WiBro), global system for mobile communications (GSM), or the like. According to an embodiment, the wireless communication, for example, may include at least one of, wireless fidelity (Wi-Fi), Bluetooth, Bluetooth Low Energy (BLE), Zigbee, near field communication (NFC), Magnetic Secure Transmission, radio frequency (RF), or body area network (BAN). Wired communication may include at least one of, for example, universal serial bus (USB), high definition multimedia interface (HDMI), recommended standard232 (RS-232), power line communication, plain old telephone service (POTS), and the like. A network in which wireless or wired communication is performed may include at least one of a telecommunication network, for example, a computer network (e.g., LAN or WAN), the Internet, or a telephone network.

In addition, the communicator 130 may communicate with the external server and provide a speech recognition service. In particular, the communicator 140 may transmit the user's speech to the external server, and receive or obtain a plurality of candidate texts corresponding to the user's speech from the external server.

The display 150 may display various information under the control of the processor 130. In particular, the display 150 may display text as a result of recognizing the user's speech. A text corresponding to the user's speech may be checked or a message for requesting renewed input of the user's speech may be displayed. The display 150 may be implemented as a touch screen with the touch panel 113.

The speaker 160 is configured to output various audio data on which various processing tasks such as decoding, amplification, and noise filtering are performed, and also various notification sounds or voice messages. In particular, the speaker 160 may output a response to the user's speech as a voice message in a natural language. Meanwhile, a configuration for outputting audio as a speaker is only an embodiment, and audio output may be implemented via any output terminal capable of outputting audio data.

The sensor 170 may sense various state information of the electronic apparatus 100. For example, the sensor 170 may include a motion sensor (e.g., gyro sensor, acceleration sensor, etc.) capable of sensing motion information of the electronic apparatus 100, and a sensor (e.g., global positioning system (GPS)) capable of detecting location information, a sensor capable of sensing environmental information around the electronic apparatus 100 (e.g., temperature sensor, humidity sensor, barometric pressure sensor, etc.), a sensor capable of sensing user information of the electronic apparatus 100 (e.g., blood pressure sensor, blood glucose sensor, pulse rate sensor, or the like), and the like. In addition, the sensor 170 may further include an image sensor (i.e., camera) for photographing the outside of the electronic apparatus 100.

The processor 130 may include one or more among a central processing unit (CPU) for processing digital signals, a micro controller unit (MCU), a micro processing unit (MPU), a controller, an application processor (AP), or a communication processor (CP), an ARM processor, or may be defined as the corresponding terms. In addition, the processor 130 may be implemented as a System on Chip (SoC), a large scale integration (LSI) in which a processing algorithm is embedded, or may be implemented in the form of a field programmable gate array (FPGA). The processor 130 may perform various functions by executing computer executable instructions stored in the memory 120. In addition, the processor 130 may include at least one of a separate AI dedicated processor, a graphics-processing unit (GPU), a neural processing unit (NPU), and a visual processing unit (VPU) to perform an artificial intelligence function.

FIG. 4 is a diagram illustrating the configuration included in a speech recognition system for recognizing a user's speech according to an embodiment of the disclosure. As illustrated in FIG. 4, the electronic apparatus 100 may include a first automatic speech recognition (ASR) decoder 410, a personal acoustic model (PAM) 420, a personal language model (PLM) 430. The external server 200 may include a second ASR decoder 440, a general acoustic model (GAM) 450, a general language model (GLM) 460. In addition, each of the electronic apparatus 100 and the external server 200 may further include a vocabulary or pronouncing dictionary. In this case, the first automatic speech recognition (ASR) decoder 410, the personal acoustic model (PAM) 420, the personal language model (PLM) 430 may be included in the personal speech recognition module. The second ASR decoder 440, the general acoustic model (GAM) 450, and the general language model (GLM) 460 may be included in the general speech recognition module.

A first ASR decoder 410 may perform speech recognition with respect to the input user's speech using the PAM 420 and the PLM 430. In this case, the PLM 430 may be a model trained based on text input by the user and text corresponding to the user information, and the PAM 420 may be a model trained based on text input by the user and the user's speech corresponding to each text corresponding to the user information.

In a configuration that communication with the external server 200 is not possible or the external server 200 is otherwise unavailable, the first ASR decoder 410 may perform speech recognition with respect to the user's speech by using the PAM 420 and the PLM 430. In addition, when the PAM 420 and the PLM 430 are trained for a threshold period to perform speech recognition without assistance of the external server 200, the first ASR decoder 410 may use the PAM 420 and the PLM 430 to perform the speech recognition with respect to the user's speech.

The second ASR decoder 440 may perform speech recognition for the input user's speech by using the GAM 450 and the GLM 460. In this case, the GAM 450 may be an acoustic model trained by speeches of general users, and the GLM 460 may be a language model trained by words defined in the language dictionary. In particular, the GAM 450 and the GLM 460 may be models trained based on a large amount of speech data and language data compared to the PAM 420 and the PLM 430.

In particular, the first ASR decoder 410 may perform speech recognition with respect to the user's speech by connecting to the second ASR decoder 440. To be specific, the second ASR decoder 440 may acquire a plurality of candidate texts corresponding to the user's speech received or obtained from the electronic apparatus 100 based on the GAM 450 and the GLM 460. The plurality of candidate texts may be texts having a probability of corresponding to the user's speech greater than or equal to a threshold value. In addition, the second ASR score 440 may acquire scores with respect to the acquired plurality of candidate texts, and transmit the candidate texts and the scores of the candidate texts to the electronic apparatus 100.

The first ASR decoder 410 may identify a text corresponding to the user's speech among the plurality of candidate texts received or obtained from the external server 200 by using the PLM 430. To be specific, the first ASR decoder 410 may correct scores with respect to each of the plurality of candidate texts received or obtained from the external server 200 based on the PLM 430. In other words, the first ASR decoder 410 may perform a weighting on scores with respect to texts frequently used by the user among the plurality of candidate texts based on the PLM 410. In this case, the weighting may be identified based on a frequency with which the user speaks the text.

Also, the first ASR decoder 410 may identify whether the candidate text having the highest corrected score among the plurality of candidate texts is equal to or greater than a threshold score. When the candidate text having the highest corrected score is greater than or equal to the threshold score, the first ASR decoder 410 may output the candidate text having the highest corrected score as a speech recognition result with respect to the user's speech. In this case, the GAM 420 may be trained based on the candidate text having the highest corrected score and the input user's speech.

In addition, when the candidate text with the highest corrected score is less than the threshold score, the ASR decoder 410 may check whether the candidate text with the highest corrected score corresponds to the user's speech or output a message requesting the user to again input the user's speech. However, this is only an embodiment, and even if the candidate text having the highest corrected score is less than the threshold score, the ASR decoder 410 may output the candidate text having the highest corrected score to the user. At this time, the candidate text having the corrected score below the threshold score may not be used for learning the GAM 420.

Figure 5:
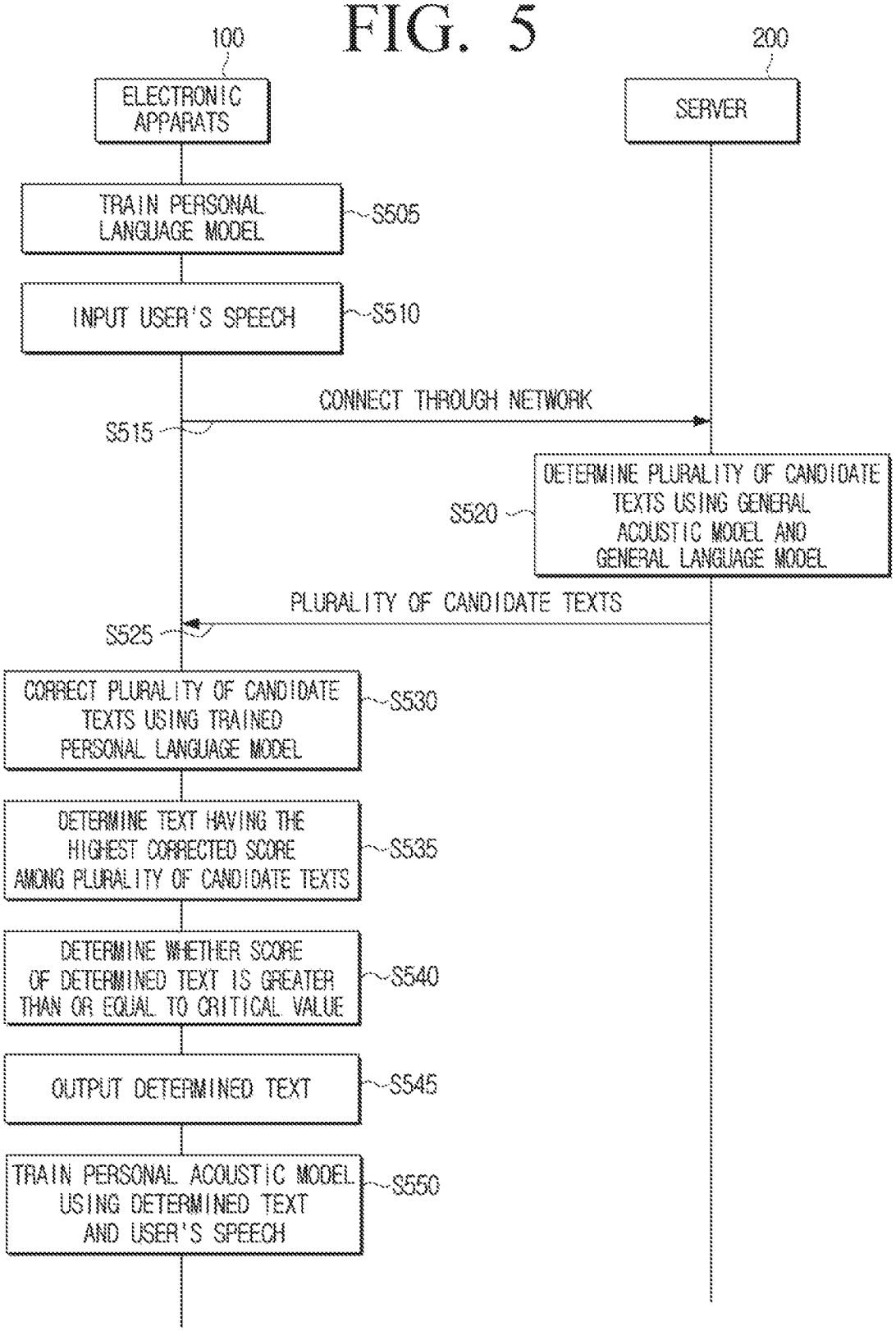
FIG. 5 is a sequence diagram illustrating a method for recognizing a user's speech using a personal language model learned based on text input by a user according to an embodiment of the disclosure.

FIG. 5 is a sequence diagram illustrating a method for recognizing a user's speech using a personal language model learned based on text input by a user according to an embodiment of the disclosure.

First, the electronic apparatus 100 may train the personal language model 430 (S505). The electronic apparatus 100 may train the personal language model based on text input while using the electronic apparatus 100. Alternatively, the electronic apparatus 100 may train the personal language model based on text acquired based on user information (e.g., user profile information, user preference information, user location information, and the like). In other words, the electronic apparatus 100 may train the personal language model to increase a statistical probability of determining corresponding text by adding weights to text frequently used by the user or text related to the user.

The electronic apparatus 100 may receive or obtain the user's speech uttered by the user (S510). In this case, after receiving a trigger voice (e.g., Bixby) for activating the speech recognition function or a user input for selecting a specific button provided on the electronic apparatus 100, the electronic apparatus 100 may receive or obtain the user's speech through a microphone.

The electronic apparatus 100 may transmit the received user's speech to the server 200 (S515).

The server 200 may identify a plurality of candidate texts corresponding to the user's speech based on the general speech recognition module including the general acoustic model 450 and the general language model 460 (S520). In this case, the server 200 may acquire a plurality of candidate texts greater than or equal to a threshold score, and also acquire scores of the plurality of candidate texts.

The server 200 may transmit information about the acquired plurality of candidate texts to the electronic apparatus 100 (S525). In other words, the server 200 may transmit information on scores of the plurality of candidate texts as well as the acquired plurality of candidate texts.

The electronic apparatus 100 may correct the scores of the plurality of candidate texts using the trained personal language model 430 (S530). In other words, the electronic apparatus 100 may correct or adjust scores of the candidate texts to increase the statistical probability of the candidate texts including texts frequently used by the user among the plurality of candidate texts acquired by using the trained personal language model 430.

The electronic apparatus 100 may identify a text having the highest corrected score among the plurality of candidate texts in which the scores are corrected (S535).

The electronic apparatus 100 may identify whether the identified score of the text is equal to or greater than a threshold value (S540). In this case, the threshold value may be a reliable probability value (e.g., 92% or more) in which the identified text is identified as text corresponding to the user's speech.

The electronic apparatus 100 may output the identified text (S545). In other words, the electronic apparatus 100 may output the identified text on the display 150 and may output the identified text to an external apparatus (e.g., conversational server). Of course, the electronic apparatus 100 may output a result of the speech recognition to any external apparatus and for any purpose.

The electronic apparatus 100 may train the personal acoustic model 420 by using the identified text and the user's speech (S550). In this case, the electronic apparatus 100 may identify the user's speech and the identified text based on the user feedback input to the identified text. In other words, when positive user feedback on the identified text is input, the electronic apparatus 100 may train the personal acoustic model 420 to increase a probability that the corresponding text corresponds to the user's speech, and when negative user feedback is input on the identified text, the electronic apparatus 100 may train the personal acoustic model 420 to decrease a probability that the corresponding text corresponds to the user's speech.

Figure 6:
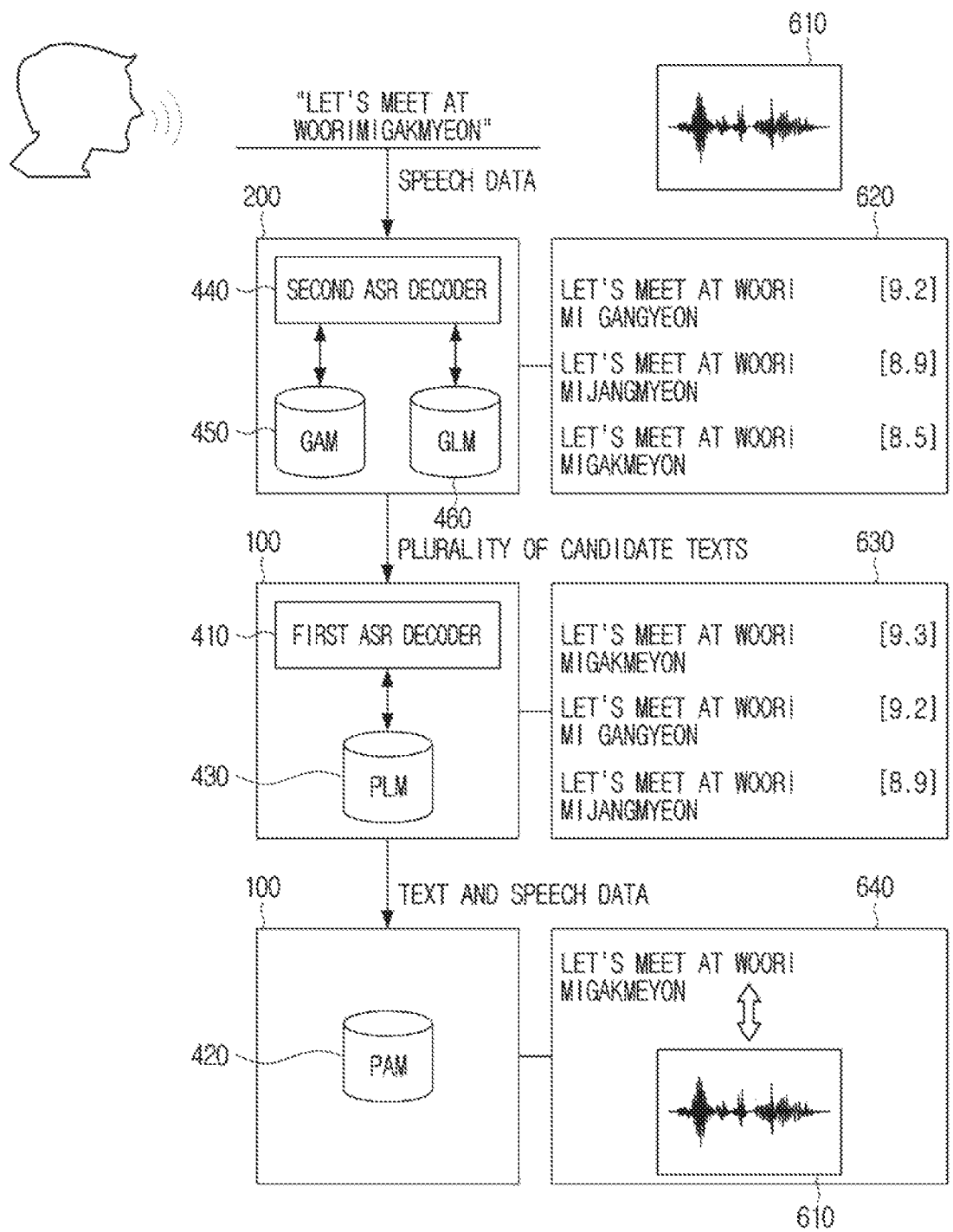
FIG. 6 is a diagram illustrating a method for performing speech recognition with respect to Korean using a personal language model learned based on text input by a user according to an embodiment of the disclosure.

FIG. 6 is a diagram illustrating a method for performing speech recognition with respect to Korean using a personal language model learned based on text input by a user according to an embodiment of the disclosure.

The electronic apparatus 100 may train PLM 430 based on text input by the user. In particular, the electronic apparatus 100 may train the PLM 430 based on text "Woorimigakmyeon" input more than a predetermined number of times while the user is performing chatting or searching services. The PLM 430 may be trained to increase a statistical probability for the "Woorimigakmyeon" as the frequency of inputs of the text "Woorimigakmyeon" increases.

The electronic apparatus 100 may receive a user's speech "Let's meet at the Woorimigakmyeon." The electronic apparatus 100 may transmit speech data 610 to the external server 200.

The second ASR decoder 440 of the external server 200 may acquire a plurality of candidate texts 620 by using GAM 450 and GLM 460. Specifically, the second ASR decoder 440 is the plurality of candidate texts 620 having a score equal to or greater than a threshold score (e.g., 8.5) on a 10-point basis, and may acquire "at Woori mi gangyeon," "at Woori mijangmyeon," and "at Woorimigakmyeon." In particular, as illustrated in FIG. 6, a score of "at Woori mi gangyeon "may be 9.2, a score of "at Woori mijangmyeon "may be 8.9, and a score of "at Woorimigakmyeon" may be 8.5.

The external server 200 may transmit the plurality of candidate texts 620 and the scores for the plurality of candidate texts 620 to the electronic apparatus 100.

The first ASR decoder 410 of the electronic apparatus 100 may modify the scores of the plurality of candidate texts 620 based on the trained PLM 430, and acquire information on the plurality of candidate texts 630 having the modified scores. The first ASR decoder 410 may increase the score of "at Woorimigakmyeon" based on probabilistic statistics of "at Woorimigakmyeon" stored in the trained PLM 430. In other words, as illustrated in FIG. 6, the first ASR decoder 410 may correct the score of "at Woorimigakmyeon" from 8.5 to 9.3. Meanwhile, as for FIG. 6, it is described that only some candidate texts of the plurality of candidate texts are corrected, but this is only an embodiment, and the scores of all candidate texts may be corrected.

The electronic apparatus 100 may output the candidate text having the highest corrected score among the plurality of candidate texts 630 that have undergone the correction process. In other words, the electronic apparatus 100 may output "Let's meet at Woorimigakmyeon" as a result of recognizing the user's speech.

In addition, the electronic apparatus 100 may train the PAM 420 based on the text ("Let's meet at Woorimigakmyeon") having the highest corrected score and the speech data 610.

Figure 7:
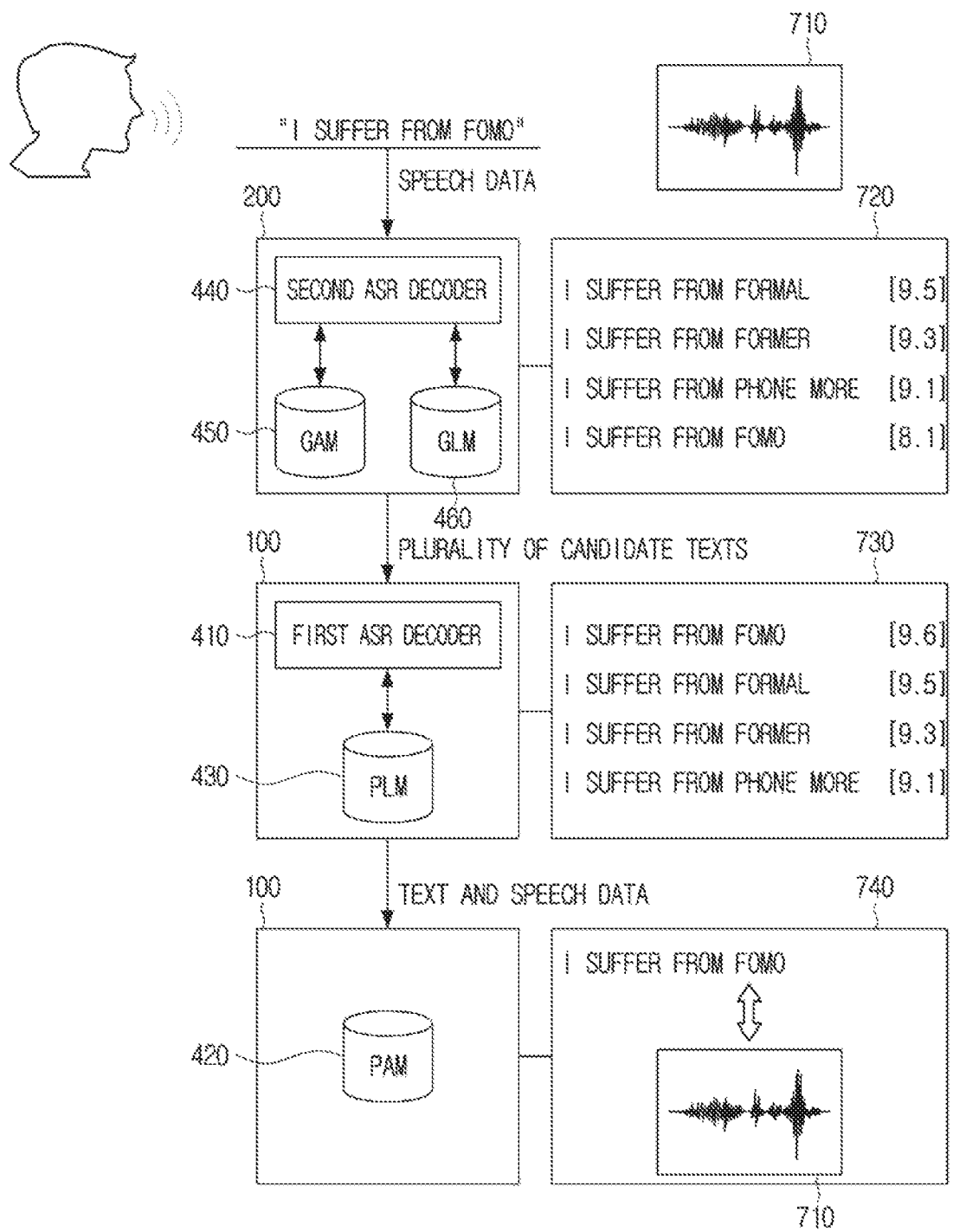
FIG. 7 is a diagram illustrating a method for performing speech recognition with respect to English using a personal language model learned based on text input by a user according to an embodiment of the disclosure.

FIG. 7 is a diagram illustrating a method for performing speech recognition with respect to English using a personal language model trained based on text input by a user according to an embodiment of the disclosure.

The electronic apparatus 100 may train the PLM 430 based on the text input by the user. the electronic apparatus 100 may train the PLM 430 based on text "FOMO" input more than a predetermined number of times while the user is performing chatting or searching services. The PLM 430 may be trained to increase a statistical probability for the "FOMO" as the number of inputs of the text "FOMO" increases.

The electronic apparatus 100 may receive a user's speech "I suffer from FOMO." The electronic apparatus 100 may transmit speech data 710 to the external server 200.

The second ASR decoder 440 of the external server 200 may acquire a plurality of candidate texts 720 by using the GAM 450 and the GLM 460. Specifically, the second ASR decoder 440 is the plurality of candidate texts 720 having a score equal to or greater than a threshold score (e.g., 8.0) on a 10-point basis, and may acquire "I suffer from formal," "I suffer from former," "I suffer from phone more," and "I suffer from FOMO." In particular, as illustrated in FIG. 7, a score of "I suffer from formal" may be 9.5, a score of "I suffer from former" may be 9.1 and a score of "I suffer from FOMO" may be 8.1.

The external server 200 may transmit the plurality of candidate texts 720 and the scores for the plurality of candidate texts 720 to the electronic apparatus 100.

The first ASR decoder 410 of the electronic apparatus 100 may correct the scores of the plurality of candidate texts 720 based on the trained PLM 430, and acquire information on the plurality of candidate texts 730 having the corrected scores. The first ASR decoder 410 may correct the score of "I suffer from FOMO" based on probabilistic statistics of "I suffer from FOMO" stored in the trained PLM 430. In other words, as illustrated in FIG. 7, the first ASR decoder 410 may correct the score of "I suffer from FOMO" from 8.1 to 9.6.

The electronic apparatus 100 may output the candidate text having the highest corrected score among the plurality of candidate texts 730, regardless whether a score each candidate text among the candidate text was adjusted upward, downward, or underwent no change. In other words, the electronic apparatus 100 may output "I suffer from FOMO" as a result of recognizing the user's speech.

In addition, the electronic apparatus 100 may train the PAM 420 based on the text ("I suffer from FOMO") having the highest corrected score and the speech data 710.

Figure 8:
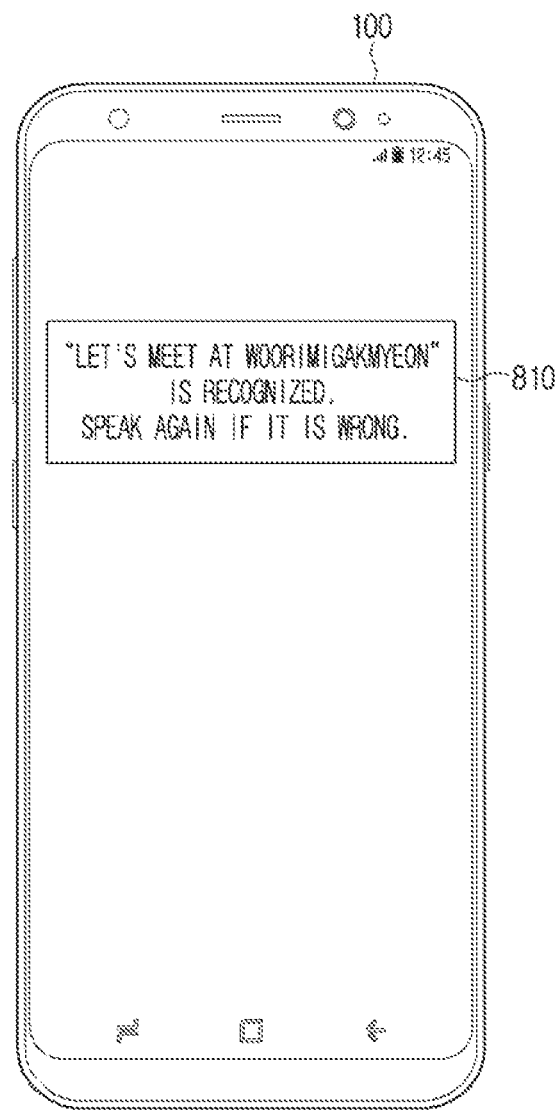
FIG. 8 is a diagram illustrating a user interface of a mobile device according to an embodiment of the disclosure.

FIG. 8 is a diagram illustrating a user interface of a mobile device according to an embodiment of the disclosure.

When the candidate text having the highest score among the plurality of candidate texts received from the external server 200 and the candidate text having the highest corrected score among the plurality of candidate texts that have undergone the correction process are different from each other, the electronic apparatus 100 may check whether the candidate text having the highest corrected score corresponds to the user's speech or output a message requesting the user to repeat the user's speech.

For example, FIG. 6 illustrates a scenario when the candidate text "let's meet at Woori mi gangyeon" having the highest score among the plurality of candidate texts received from the external server 200 and the candidate text "let's meet at Woorimigakmeyon" having the highest corrected score among the plurality of candidate texts that have undergone the correction process are different. The electronic apparatus 100 may display text corresponding to the user's speech, as illustrated in FIG. 8, and may confirm via inquiry to the user whether "let's meet at Woori migakmyeon" is correct by displaying a message 810 requesting the user to repeat the user's speech if the voice recognition by the electronic apparatus 100 does not correspond to the user's intention.

When a positive confirmation (e.g., a feedback saying that "let's meet at Woorimigakmeyon" corresponds to the user's speech or a feedback without user input for threshold time after the message 810 is displayed) is input, the electronic apparatus 100 may train the PAM 420 to increase a probability that the text corresponding to the user's speech is "let's meet at Woorimigakmeyon." However, when feedback negative confirmation (e.g., feedback that inputs a new speech) is input, the electronic apparatus 100 may train the PAM 420 to reduce a probability that the text corresponding to the user's speech is "let's meet at Woorimigakmeyon."

Meanwhile, in the above-described embodiment, when the candidate text having the highest score among the plurality of candidate texts received from the external server 200 and the candidate text having the highest corrected score among the plurality of candidate texts that have undergone the correction process are different from each other, the electronic apparatus 100 outputs the message 810. However when the highest corrected score among the plurality of candidate texts that have undergone the correction process is less than or equal to the threshold score, the electronic apparatus 100 may output the message 810 as described in FIG. 8.

Figure 9:
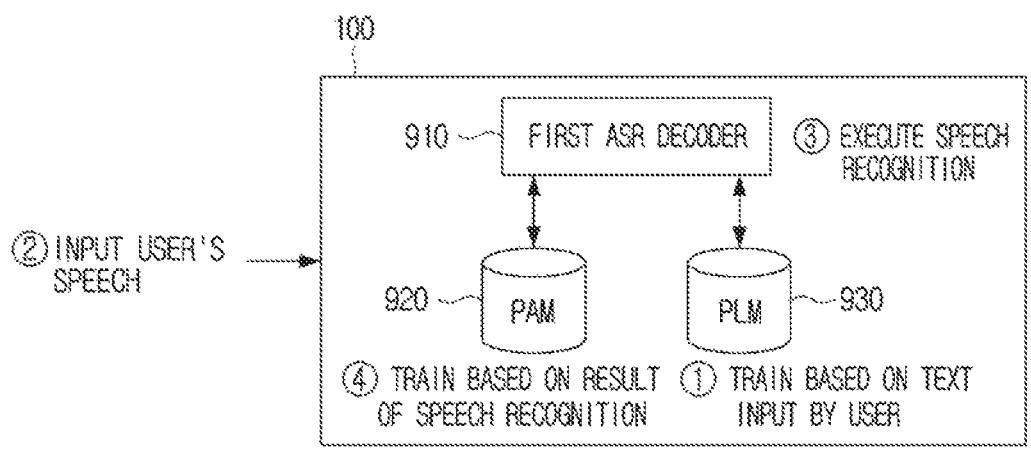
FIG. 9 is a use diagram illustrating an embodiment of recognizing a user's speech using a personal language model learned based on text input by a user and relearning a personal acoustic model based on a recognition result according to another embodiment of the disclosure.

FIG. 9 is a use diagram illustrating an embodiment of recognizing a user's speech using a personal language model learned based on text input by a user and relearning a personal acoustic model based on a recognition result according to an embodiment of the disclosure.

The electronic apparatus 100 may train a personal language model 930 based on text input by the user. The electronic apparatus 100 may acquire information on text input to perform various services while the user is using the electronic apparatus 100. In addition, the electronic apparatus 100 may train the personal language model based on the information on the text input by the user. In other words, the electronic apparatus 100 may train the personal language model 930 to increase a statistical probability with respect to text that is frequently used by the user. The electronic apparatus 100 may train the personal language model 930 based on the number of times that the user uses the corresponding text.

In addition, the electronic apparatus 100 may train the personal language model 930 based on text acquired by user information. In other words, the electronic apparatus 100 may acquire text based on various user information such as user profile information, user preference information, user location information, or the like.

After the personal language model 930 is trained based on the text input by the user or user information, the electronic apparatus 100 may acquire the user's speech uttered by the user. The electronic apparatus 100 may acquire the user's speech through a microphone present in the electronic apparatus, but this is only an embodiment. The user's speech may be acquired through an external microphone electronically connected to the electronic apparatus 100.

The electronic apparatus 100 may perform speech recognition with respect to the user's speech based on PAM 920 and PLM 930 by an ASR decoder 910. In other words, the electronic apparatus 100 may identify the text having the highest probability of corresponding to the user's speech based on the PAM 920 and PLM 930, and acquire the identified text as a result of the speech recognition.

The electronic apparatus 100 may output the identified text. The electronic apparatus 100 may output the identified text on the display 150 and may output the text to the external apparatus.

The electronic apparatus 100 may retrain the personal acoustic model 920 based on the speech recognition result. In other words, the electronic apparatus 100 may retrain the personal acoustic model 920 based on the user's speech and the identified text. In other words, the electronic apparatus 100 may retrain the personal acoustic model 920 to reflect user characteristics based on text frequently used by the user and user's speech corresponding thereto.

In addition, when user feedback on the identified text is input, the electronic apparatus 100 may retrain the personal language model 920 based on the user feedback. For example, when negative feedback is input to the identified text, the electronic apparatus 100 may retrain the personal language model to lower a statistical probability of the identified text based on the negative user feedback.

The personal acoustic model 920 and the personal language model 930 are described as separated in the above-described embodiments. However, the personal acoustic model 920 and the personal language model 930 may be implemented as one neural network model. In other words, the electronic apparatus 100 may train the neural network model based on text input by the user, acquire text corresponding to the user's speech by using the trained neural network model, and retrain the neural network model based on the acquired text and the user's speech.

Figure 10:
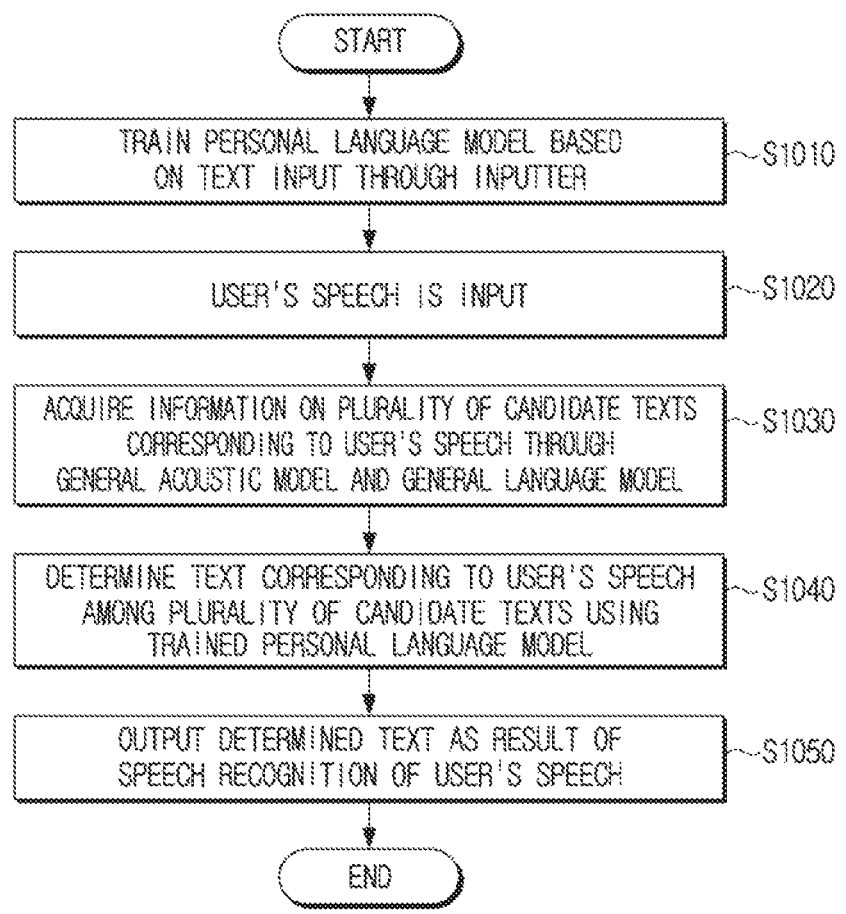
FIG. 10 is a flowchart illustrating a method of controlling an electronic apparatus according to an embodiment of the disclosure.

FIG. 10 is a flowchart illustrating a method of controlling an electronic apparatus according to an embodiment of the disclosure.

The electronic apparatus 100 may train the personal language model based on the text input through the inputter 110 (S1010). In other words, the electronic apparatus 100 may train the personal language model based on text input by the user while using the electronic apparatus 100. In addition, the electronic apparatus 100 may train the personal language model based on text acquired based on user information.

After the personal language model is trained, the electronic apparatus 100 may receive the user's speech (S1020).

The electronic apparatus 100 may acquire information on the plurality of candidate texts corresponding to the user's speech through the general acoustic model and the general language model (S1030). To be specific, the electronic apparatus 100 may transmit the user's speech to the external server 200 that stores the general acoustic model and the general language model, and receive information on the plurality of candidate texts corresponding to the user's speech acquired based on the general acoustic model and the general language model from the external server 200. The electronic apparatus 100 may receive score information on the plurality of candidate texts.

The electronic apparatus 100 may identify the text corresponding to the user's speech among the plurality of candidate texts by using the trained personal language model (S1040). The electronic apparatus 100 may correct scores for the plurality of candidate texts by using the trained personal language model, and select the candidate text having the highest corrected score among the plurality of candidate texts as text corresponding to the user's speech.

The electronic apparatus 100 may output text identified by a voice recognition result of the user's speech (S1050). The electronic apparatus 100 may output the identified text through the display 150, or the identified text may be output by the external device (e.g., interactive server). In addition, the electronic apparatus 100 may train the personal acoustic model based on the user's speech and the identified text.

Figure 11:
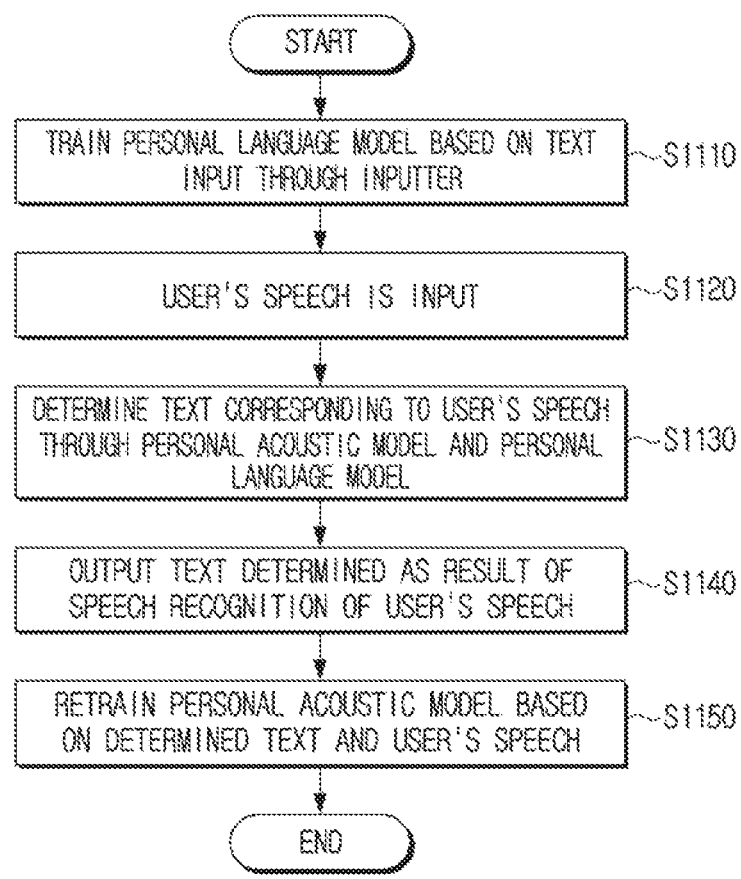
FIG. 11 is a flowchart illustrating a method of controlling an electronic apparatus according to an embodiment of the disclosure.

FIG. 11 is a flowchart illustrating a method of controlling an electronic apparatus according to an embodiment of the disclosure.

The electronic device 100 may train the personal language model based on the text input through the inputter 110 S1110. In other words, the electronic apparatus 100 may train the personal language model based on text input by the user while using the electronic apparatus 100. In addition, the electronic apparatus 100 may train the personal language model based on text acquired based on user information.

After the personal language model is trained, the electronic apparatus 100 may receive the user's speech S1120.

The electronic apparatus 100 may identify text corresponding to the user's speech through the personal acoustic model and the personal language model (S1130). The electronic apparatus 100 may identify the candidate text having the highest score among the candidate texts acquired using the personal acoustic model and the personal language model as text corresponding to the user's speech.

The electronic apparatus 100 may output text identified as the voice recognition result of the user's speech (S1140). The electronic apparatus 100 may output the identified text through the display 150, or the identified text may be output by an external device (e.g., interactive server).

The electronic apparatus 100 may retrain the personal acoustic model based on the identified text and the user's speech (S1150).

As various embodiments of the disclosure described above, as the user uses the personal language model trained by text frequently used by the user, the electronic apparatus may provide more accurate speech recognition results for the user's characteristics.

In addition, by training the personal acoustic model based on the speech recognition result acquired through the trained personal language model, the electronic apparatus may have a language model and an acoustic model reflecting the user's characteristics.

The term "module" as used herein includes units made up of hardware, software, or firmware, and may be used interchangeably with terms such as logic, logic blocks, components, or circuits. A "module" may be an integrally constructed component or a minimum unit or part thereof that performs one or more functions. For example, the module may be configured as an application-specific integrated circuit (ASIC).

The various example embodiments described above may be implemented as a software program including an instruction stored on machine-readable storage media. The machine is an apparatus which is capable of calling a stored instruction from the storage medium and operating according to the called instruction, and may include an electronic apparatus (e.g., an electronic apparatus 100) according to the above-described example embodiments. When the instruction is executed by a processor, the processor may perform a function corresponding to the instruction directly or using other components under the control of the processor. The command may include a code generated or executed by a compiler or an interpreter. A machine-readable storage medium may be provided in the form of a non-transitory storage medium. Herein, the term "non-transitory" only denotes that a storage medium does not include a signal but is tangible, and does not distinguish the case where a data is semi-permanently stored in a storage medium from the case where a data is temporarily stored in a storage medium.

According to an example embodiment, the method according to the various example embodiments described above may be provided as being included in a computer program product. The computer program product may be traded as a product between a seller and a consumer. The computer program product may be distributed online in the form of machine-readable storage media (e.g., compact disc read only memory (CD-ROM)) or through an application store (e.g., Play Store™). In the case of online distribution, at least a portion of the computer program product may be at least temporarily stored or temporarily generated in a server of the manufacturer, a server of the application store, or a storage medium such as memory.

The respective components (e.g., module or program) according to the various example embodiments may include a single entity or a plurality of entities, and some of the corresponding sub-components described above may be omitted, or another sub-component may be further added to the various example embodiments. Alternatively, or additionally, some components (e.g., module or program) may be combined to form a single entity which performs the same or similar functions as the corresponding elements before being combined. Operations performed by a module, a program, or other component, according to various exemplary embodiments, may be sequential, parallel, or both, executed iteratively or heuristically, or at least some operations may be performed in a different order, omitted, or other operations may be added.

What is claimed is:

1. An electronic apparatus comprising:
an input circuitry comprising a touch panel and a microphone;
a memory storing at least one instruction and a personal language model trained to recognize speech of a user of the electronic apparatus; and
a processor configured to execute at least one instruction, wherein the processor when executing the at least one instruction is configured to:
based on a text input by the user of the electronic apparatus being received through the touch panel, train the personal language model corresponding to the user from among at least one personal language model using the received text,
based on a first input speech of the user of being received through the microphone, acquire information on a plurality of candidate texts corresponding to the first input speech and a plurality of scores corresponding to the plurality of candidate texts through a general speech recognition module including a general language model different from the personal language model,
identify text corresponding to the first input speech from among the plurality of candidate texts by correcting at least one score of the plurality of scores corresponding to the plurality of candidate texts using the trained personal language model, and
output the identified text as a result of speech recognition of the first input speech,
wherein the processor when executing the at least one instruction is further configured to:
acquire user information comprising user preference information of the user and user location information of the user,
train the personal language model based on the received text, the user preference information of the user and the user location information of the user,
identify the text corresponding to the first input speech using the personal language model based on the received text, the user preference information of the user and the user location information of the user,
based on a candidate text having a highest score among the plurality of candidate texts corresponding to the first input speech and the text identified by correcting the at least one score of the plurality of scores corresponding to the plurality of candidate texts using the trained personal language model being different from each other, output a message requesting the user to input a user feedback,
based on the highest score of the candidate text being less than a threshold score, output the message requesting the user to input the user feedback, and
in response to the user feedback being input, train the personal language model based on the user feedback.

2. The electronic apparatus as claimed in claim 1, wherein the memory stores a personal acoustic model of the user of the electronic apparatus, and
wherein the processor when executing the at least one instruction is further configured to train the personal acoustic model based on the identified text and the first input speech.

3. The electronic apparatus as claimed in claim 1, wherein the general speech recognition module comprises a general acoustic model and the general language model, and
wherein the processor when executing the at least one instruction is further configured to:
acquire the plurality of candidate texts corresponding to the first input speech and the plurality of scores corresponding to the plurality of candidate texts through the general acoustic model and the general language model,
adjust the plurality of scores using the personal language model, and
select the candidate text among the plurality of candidate texts having the highest score among the plurality of scores adjusted using the personal language model as the text corresponding to the first input speech.

4. The electronic apparatus as claimed in claim 3, wherein the processor when executing the at least one instruction is further configured to identify whether the highest score of the candidate text is greater than or equal to the threshold score, and
based on the highest score being greater or equal to the threshold score, select the candidate text as the text corresponding to the first input speech.

5. The electronic apparatus as claimed in claim 4, wherein the processor when executing the at least one instruction is further configured to control the electronic apparatus to output a message requesting the user to repeat the first input speech, based on the highest score being less than the threshold score.

6. The electronic apparatus as claimed in claim 1, further comprising:
a communicator,
wherein the general speech recognition module is stored in an external server, and
wherein the processor when executing the at least one instruction is further configured to:

based on the first input speech, control the communicator to transmit the first input speech to the external server, and obtain information on the plurality of candidate texts corresponding to the first input speech from the external server.

7. The electronic apparatus as claimed in claim 1, wherein the processor when executing the at least one instruction is further configured to, based on a user confirmation of the identified text as the result of the speech recognition of the first input speech, retrain the personal language model based on the result of the speech recognition of the first input speech.

8. A method of controlling an electronic apparatus, the method comprising:

based on a text input by a user of the electronic apparatus being received through a touch panel, training a personal language model corresponding to the user from among at least one personal language model using the received text;

based on a first input speech of the user being received through a microphone, acquiring information on a plurality of candidate texts corresponding to the first input speech and a plurality of scores corresponding to the plurality of candidate texts through a general speech recognition module including a general language model different from the personal language model;

identifying text corresponding to the first input speech from among the plurality of candidate texts by correcting at least one score of the plurality of scores corresponding to the plurality of candidate texts using the personal language model trained to recognize speech of the user; and outputting the identified text as a result of speech recognition of the first input speech, wherein the method further comprises:

acquiring user information comprising user preference information of the user and user location information of the user, wherein the training of the personal language model corresponding to the user comprises training the personal language model based on the received text, the user preference information of the user and the user location information of the user, and wherein the identifying of the text corresponding to the first input speech comprises identifying the text corresponding to the first input speech using the personal language model based on the received text, the user preference information of the user and the user location information of the user, wherein the method further comprises:

based on a candidate text having a highest score among the plurality of candidates texts corresponding to the first input speech and the text identified by correcting the at least one score of the plurality of scores corresponding to the plurality of candidate texts using the trained personal language model being different from each other, outputting a message requesting the user to input a user feedback, based on the highest score of the candidate text being less than a threshold score, outputting the message requesting the user to input the user feedback, and in response to the user feedback being input, training the personal language model based on the user feedback.

9. The method as claimed in claim 8, further comprising:

training a personal acoustic model based on the identified text and the first input speech.

10. The method as claimed in claim 8, wherein the general speech recognition module comprises a general acoustic model and the general language model, wherein the acquiring of the information comprises acquiring the plurality of candidate texts corresponding to the first input speech and the plurality of scores corresponding to the plurality of candidate texts through the general acoustic model and the general language model, wherein the identifying comprises:

adjusting the plurality of scores corresponding using the personal language model, and selecting, among the plurality of candidate texts, the candidate text having the highest score among the plurality of scores adjusted using the personal language model as the text corresponding to the first input speech.

11. The method as claimed in claim 10, wherein the selecting of the candidate text among the plurality of candidate texts comprises:

identifying whether the highest score of the candidate text is greater than or equal to the threshold score, and based on the highest score being greater than or equal to the threshold score, selecting the candidate text as the text corresponding to the first input speech.

12. The method as claimed in claim 11, wherein the selecting of the candidate text among the plurality of candidate texts comprises providing a message requesting the user to repeat the first input speech, based on the highest score being less than the threshold score.

13. The method as claimed in claim 8, wherein the general speech recognition module is stored in an external server, and wherein the acquiring of the information comprises transmitting the first input speech to the external server; and obtaining information on the plurality of candidate texts corresponding to the input speech from the external server.

14. The method as claimed in claim 8, further comprising:

based on user confirmation of the identified text as the result of the speech recognition of the first input speech, retraining the personal language model based on the result of the speech recognition of the first input speech.

* * * * *